United States Patent
Philippe et al.

(10) Patent No.: US 10,239,336 B2
(45) Date of Patent: Mar. 26, 2019

(54) METHOD AND DEVICE FOR THE SECURE PROTECTION OF AN OFFICIAL DOCUMENT AND OFFICIAL DOCUMENT THUS PROTECTED

(71) Applicant: FASVER, Baillargues (FR)

(72) Inventors: Eric Philippe, Eyguieres (FR); Laurence Bes, Jacou (FR)

(73) Assignee: FASVER, Baillargues (FR)

( * ) Notice: Subject to any disclaimer, the term of this patent is extended or adjusted under 35 U.S.C. 154(b) by 295 days.

(21) Appl. No.: 14/891,169

(22) PCT Filed: May 12, 2014

(86) PCT No.: PCT/FR2014/051098
§ 371 (c)(1),
(2) Date: Nov. 13, 2015

(87) PCT Pub. No.: WO2014/184481
PCT Pub. Date: Nov. 20, 2014

(65) Prior Publication Data
US 2016/0089923 A1 Mar. 31, 2016

(30) Foreign Application Priority Data
May 13, 2013 (FR) ...................................... 13 54254

(51) Int. Cl.
*B42D 15/00* (2006.01)
*B42D 15/10* (2006.01)
(Continued)

(52) U.S. Cl.
CPC .......... *B41M 5/3375* (2013.01); *B41M 3/142* (2013.01); *B41M 5/323* (2013.01);
(Continued)

(58) Field of Classification Search
CPC .. B41M 5/3375; B41M 5/3372; B41M 5/323; B41M 3/142; B41M 2205/04;
(Continued)

(56) References Cited

U.S. PATENT DOCUMENTS

| 4,028,118 A | 6/1977 | Nakasuji et al. |
| 5,096,489 A | 3/1992 | Laver |

(Continued)

FOREIGN PATENT DOCUMENTS

| CA | 2 716 892 A1 | 9/2009 |
| CN | 1280920 A | 1/2001 |

(Continued)

OTHER PUBLICATIONS

International Search Report, dated Aug. 6, 2014, from corresponding PCT application.
(Continued)

*Primary Examiner* — Justin V Lewis
(74) *Attorney, Agent, or Firm* — Levenfeld Pearlstein, LLC

(57) ABSTRACT

A method for the secure protection of a portion of the surface of an official document bearing markings, in which: a transparent security layer (17) is selected, the layer including at least one semi-transparent printed image including at least one transparent binder and at least one thermochromic pigment (14, 13, 12, 11); the semi-transparent printed image reveals at least one semi-transparent visible pattern in a first non-activated state at least a first temperature, such that the markings can be seen through the image, the pattern not being visible in a second activated state at least a second temperature different from the first temperature. A device for the secure protection of a portion of the surface of an official document and such an official document are also described.

19 Claims, 1 Drawing Sheet

Figure 1:
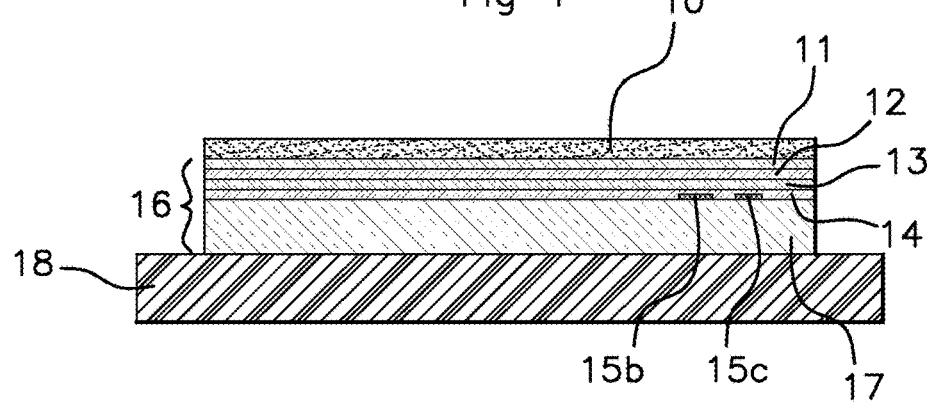

(51) Int. Cl.
*G09C 3/00* (2006.01)
*B41M 5/337* (2006.01)
*C09D 11/50* (2014.01)
*B42D 25/36* (2014.01)
*B42D 25/378* (2014.01)
*B41M 3/14* (2006.01)
*C09D 11/037* (2014.01)
*B42D 25/45* (2014.01)
*B41M 5/323* (2006.01)
*B42D 25/351* (2014.01)
*D21H 21/44* (2006.01)
*D21H 21/48* (2006.01)

(52) U.S. Cl.
CPC ......... *B41M 5/3372* (2013.01); *B42D 25/351* (2014.10); *B42D 25/36* (2014.10); *B42D 25/378* (2014.10); *B42D 25/45* (2014.10); *C09D 11/037* (2013.01); *C09D 11/50* (2013.01); *B41M 2205/04* (2013.01); *B42D 2033/04* (2013.01); *B42D 2035/34* (2013.01); *D21H 21/44* (2013.01); *D21H 21/48* (2013.01)

(58) Field of Classification Search
CPC ...... B42D 25/351; B42D 25/45; B42D 25/36; B42D 2035/34; B42D 2033/04; C09D 11/037; C09D 11/50; D21H 21/48; D21H 21/44
USPC ............ 283/67, 72, 74, 75, 94, 98, 109, 901
See application file for complete search history.

(56) References Cited

U.S. PATENT DOCUMENTS

| | | | |
|---|---|---|---|
| 5,232,527 | A | 8/1993 | Vernhet et al. |
| 6,413,305 | B1 | 7/2002 | Mehta et al. |
| 6,494,490 | B1 | 12/2002 | Trantoul |
| 7,316,422 | B1 | 1/2008 | Schmitz |
| 7,544,266 | B2 | 6/2009 | Herring et al. |
| 2006/0145469 | A1 | 7/2006 | Lubrino et al. |
| 2012/0104743 | A1* | 5/2012 | Mehta ............... C09D 5/26 283/95 |

FOREIGN PATENT DOCUMENTS

| | | |
|---|---|---|
| CN | 1308579 A | 8/2001 |
| CN | 1377437 A | 10/2002 |
| CN | 100419159 C | 9/2008 |
| CN | 100513200 C | 7/2009 |
| CN | 101831213 A | 9/2010 |
| CN | 101164797 B | 7/2012 |
| CN | 102448730 B | 9/2014 |
| CN | 102574411 B | 10/2014 |
| CN | 101960495 B | 12/2014 |
| DE | 10 2006 016048 A1 | 10/2007 |
| EP | 0 271 941 A1 | 6/1988 |
| EP | 0400220 A1 | 12/1990 |
| EP | 0400220 B1 | 8/1994 |
| EP | 0678377 B1 | 9/2000 |
| EP | 1109675 B2 | 4/2010 |
| EP | 1095996 B8 | 5/2011 |
| EP | 2322587 A1 | 5/2011 |
| FR | 2 834 484 A1 | 7/2003 |
| FR | 2 987 577 A1 | 9/2013 |
| GB | 2197109 B | 9/1990 |
| JP | 2002129029 A | 5/2002 |
| WO | 00/24587 A1 | 5/2000 |
| WO | 2009/106242 A1 | 9/2009 |
| WO | 2013/132186 A1 | 9/2013 |

OTHER PUBLICATIONS

International Search Report and Written Opinion for International Application No. PCT/FR2014/051099, dated Aug. 7, 2014.

* cited by examiner

METHOD AND DEVICE FOR THE SECURE PROTECTION OF AN OFFICIAL DOCUMENT AND OFFICIAL DOCUMENT THUS PROTECTED

The invention relates to a method and a device for the security protection of a surface portion of an official document bearing inscriptions. It extends to an official document so protected.

Throughout the text, "visible light" is understood as being any light whose spectral composition is situated in the visible spectrum, in wavelengths of from 0.4 µm to 0.8 µm.

Throughout the text, "semi-transparent image" is understood as being any image which, when it covers a document or a product, allows underlying characters or motifs of the document to be discerned—especially read—through the image by normal viewing (without a specific instrument), at least under lighting in visible light. In particular, a semi-transparent image does not totally mask the underlying characters and/or motifs of the document, at least under lighting in visible light.

Throughout the text, "inscription" or "inscription to be read" denotes any symbol or motif produced on a layer of a document which can be read by a person at least under certain conditions (especially under normal lighting in visible light; and/or under specific lighting; and/or after activation of an electronic device (screen) or other device, etc.). It can be various items of personal information of an official document, or common items of information and/or security information; text (manual writing or printed characters); codes (ASCII, universal codes for optoelectronic reading such as bar codes, etc.); images or photographs, etc.

A number of devices and methods are known for the security protection of official documents (passports, visas, identity cards, driving licenses, vehicle registration documents, bank cards, bank cheques, diplomas, certificates, travel tickets, access control cards, badges, labels, legal acts, contracts, legal registers, cadastral maps, trust documents, bank notes, manufacturing plans or other plans, etc.) bearing inscriptions, especially inscriptions to be read, such as various items of information (name, forename, address, photo, signature, etc. of a holder or of parties, etc.) and/or common items of information (security motifs, matrices, executives, field names, seals, holograms, signatures, values, etc.) which are to be protected against attempts at forgery and/or counterfeiting and/or for authentication and/or in order to guarantee the integrity thereof (that is to say, that they have not been altered or modified).

US 2006/0145469 describes a document, in particular a cheque, protected against forgery, having a first mark formed with the aid of an ink which causes a pearlescent effect and a second mark formed with the aid of a thermochromic ink. The mark formed with the aid of a thermochromic ink is opaque and is applied to only a limited portion of the document. The mark formed with the aid of a thermochromic ink is visible at ambient temperature and disappears when its temperature is increased, for example when a thumb is applied to said mark, the mark reappearing when it returns to temperature after the source of heat has been removed.

There is also known from WO 2009/106242 and CA 2 716 892 a security device comprising at least one layer of thermochromic ink which covers and conceals two motifs, the first motif becoming visible when the thermochromic ink is subjected to a first temperature increase and the second motif becoming visible when the thermochromic ink is subjected to a second temperature increase which is different from the first. The layer of thermochromic ink forms an opaque motif of limited size on the document to be protected.

In these known devices, the motifs formed on the basis of thermochromic ink are opaque at a temperature below the activation temperature of the thermochromic materials and become colorless and transparent at and above the activation temperature of the thermochromic materials. The motifs formed on the basis of thermochromic ink are therefore transparent only in their activated state and do not allow the information printed on the document to be protected to remain visible when they are in the non-activated state.

Furthermore, the thermochromic images of such known devices are limited in terms of fineness of printing and richness of color.

The invention aims to remedy the disadvantages of the various devices of the prior art and to propose a method and a device for security protection which allow the inscriptions to be protected that are borne by—especially provided on—the official document to remain permanently visible.

The invention aims also to propose a method and a device for top-level security protection which can be authenticated by normal viewing without requiring a specific instrument such as a UV lamp, for example.

The invention aims also to propose a method and a device for security protection which allow a document, in particular an official document, to be authenticated quickly and without requiring the document to be especially inclined or deformed.

The invention aims to propose a device for security protection which is durable, and in particular whose lifetime is greater than 1 year and may reach 10 years or more.

To that end, the invention relates to a method for the security protection of a surface portion of a layer of an official document bearing inscriptions to be protected, wherein:

a transparent security layer is applied to said surface portion so as to cover said inscriptions to be protected, wherein:

there is chosen a transparent security layer comprising at least one semi-transparent printed image comprising at least one transparent binder and at least one thermochromic pigment adapted to change color when there is a predetermined temperature variation, in a first state, named the non-activated state, at at least a first temperature, said semi-transparent printed image reveals at least one semi-transparent visible motif so as to allow said inscriptions to be protected to be seen through the image, said motif not being visible in a second state, named the activated state, at at least a second temperature which is different from the first temperature, the proportion of thermochromic pigments in the binder is such that the semi-transparent image allows said inscriptions to be protected to be seen through the image when the thermochromic pigments are in the non-activated state.

In some possible embodiments of the invention, said transparent security layer can be a layer which forms part of the official document, especially an outer layer thereof, for example when the official document is a card made of synthetic material (for example a card formed of a plurality of superposed and laminated polycarbonate layers). In these embodiments, said semi-transparent printed image can be printed on such an outer layer of the official document before the various layers constituting the official document are hot laminated under pressure or, on the other hand, after such lamination. Said semi-transparent printed image is printed so that it covers said inscriptions to be protected which are borne by an underlying layer of the document.

The invention extends to a device for the security protection of a surface portion of a layer of an official document bearing inscriptions to be protected, said device comprising a transparent security layer which extends in a format adapted to that of said surface portion, wherein:

the transparent security layer comprises at least one semi-transparent printed image comprising at least one transparent binder and at least one thermochromic pigment adapted to change color when there is a predetermined temperature variation, in a first state, named the non-activated state, at at least a first temperature, said semi-transparent printed image reveals at least one semi-transparent visible motif so as to allow the inscriptions to be protected to be seen through the image, said motif not being visible in a second state, named the activated state, at at least a second temperature which is different from the first temperature, the proportion of thermochromic pigments in the binder is such that the semi-transparent image allows the inscriptions to be protected to be seen through the image when the thermochromic pigments are in the non-activated state.

In some possible embodiments of the invention, said transparent security layer is a transparent security film. The invention therefore relates in particular to a method for the security protection of a surface portion of an official document bearing inscriptions, wherein:

there is chosen a protection device comprising a transparent security film which extends in a format adapted to that of said surface portion and is carried by a support film, said transparent security film is applied—especially by transfer—to said surface portion, wherein:

there is chosen a protection device the transparent security film of which comprises at least one semi-transparent printed image comprising at least one transparent binder and at least one thermochromic pigment adapted to change color when there is a predetermined temperature variation, in a first state, named the non-activated state, at at least a first temperature, said semi-transparent printed image reveals at least one semi-transparent visible motif so as to allow said inscriptions to be protected to be seen through the image, said motif not being visible in a second state, named the activated state, at at least a second temperature which is different from the first temperature, the proportion of thermochromic pigments in the binder is such that the semi-transparent image allows said inscriptions to be protected to be seen through the image when the thermochromic pigments are in the non-activated state.

The invention extends also to a device for the security protection of a surface portion of an official document bearing inscriptions, said device comprising:

a transparent security film which extends in a format adapted to that of said surface portion, a support film carrying said transparent security film, wherein:

the transparent security film comprises at least one semi-transparent printed image comprising at least one transparent binder and at least one thermochromic pigment adapted to change color when there is a predetermined temperature variation, in a first state, named the non-activated state, at at least a first temperature, said semi-transparent printed image reveals at least one semi-transparent visible motif so as to allow the inscriptions to be seen through the image, said motif not being visible in a second state, named the activated state, at at least a second temperature which is different from the first temperature, the proportion of thermochromic pigments in the binder is such that the semi-transparent image allows the inscriptions to be seen through the image when the thermochromic pigments are in the non-activated state.

The inventors have observed, wholly unexpectedly, that it is possible to print an image with the aid of at least one printing composition comprising thermochromic pigments, and to obtain a printed image which is semi-transparent and colored (having a semi-transparent visible motif) when the thermochromic pigments are in a non-activated state, at at least a first temperature, and completely transparent and colorless (without a semi-transparent visible motif) when the thermochromic pigments are in an activated state, at at least a second temperature which is different from the first temperature. There is thus obtained an official document having a security protection device which is adapted to be able to cover inscriptions which are provided on said official document without preventing them from being seen and/or read.

A method and a device according to the invention therefore allow the security of the official documents to be improved since they thus permit the protection of larger surface portions thereof and in particular the surface portions that bear inscriptions to be read which are to be readable at all times (in both the activated state and the non-activated state).

In particular, advantageously and according to the invention, the first temperature is below the second temperature. In this manner, a temperature increase allows a change from the transparent and colored non-activated state to the transparent and colorless activated state.

In particular, advantageously and according to the invention, the thermochromic pigments are chosen so that they are in the transparent and colored state (non-activated state) at ambient temperature (in particular at a temperature of from 15° C. to 35° C.).

In particular, advantageously and according to the invention, the thermochromic pigments are chosen so that they have at least one activation temperature between 20° C. and 50° C., especially between 25° C. and 35° C.

It is thus possible, for example, to change from the non-activated state to the activated state by heating obtained by simple contact with a finger or the hand on the surface of a printed image according to the invention, and optionally gentle rubbing of the fingers on the surface of a printed image according to the invention.

The transparent security layer—especially the transparent security film—can be formed of any material which is adapted to be able to be printed. Advantageously and according to the invention, the transparent security layer—especially the transparent security film—is formed of at least one material chosen from cellulose materials and polymer materials.

In particular, in the embodiments where the transparent security layer is a transparent security film carried by a support film, the protection device according to the invention is advantageously a transfer device—especially a hot transfer device. Accordingly, advantageously and according to the invention, the support film carrying the transparent security film is adapted to permit the transfer, especially the hot transfer, of the transparent security film to said surface portion by lamination of the security protection device onto said surface portion. Advantageously and according to the invention, the transparent security film is formed of at least one polymer material chosen from polycarbonates, polyvinyl chlorides (PVC), polyethylene terephthalates (PET), glycol-modified polyethylene terephthalates (PETG), copolymers thereof and mixtures thereof.

The support carrying said transparent security film can be formed of any rigid or flexible material, multi-layer or not, and can be formed of at least one material chosen from cellulose materials and polymer materials. Advantageously and according to the invention, the support is formed of at least one cellulose material chosen from papers, especially security papers. Advantageously and according to the invention, the support is formed of at least one polymer material chosen from polycarbonates, polyvinyl chlorides (PVC), polyethylene terephthalates (PET), glycol-modified polyethylene terephthalates (PETG), copolymers thereof and mixtures thereof.

The assembly formed by said support and said transparent security film can be, for example, a transfer film marketed by FASVER Baillargues (France) under reference Fasprotek™ or Passprotek™, or Fasfilm™ or Transfilm™, and/or in accordance with EP-0271941 and U.S. Pat. No. 5,232,527, the transparent security film comprising at least one semi-transparent printed image according to the invention.

Furthermore, advantageously and according to the invention, said semi-transparent image is a colored image. In particular, advantageously and according to the invention, said semi-transparent image is a polychromatic image.

Advantageously and according to the invention, said semi-transparent image is printed onto said transparent security layer—especially onto said transparent security film—, preferably onto a face that does not form an outer face of the official document. The semi-transparent image can be printed with the aid of any printing technique, for example by screen printing, inkjet printing or flexography. In particular, advantageously and according to the invention, said semi-transparent image can be printed with the aid of a printing technique which allows very varied motifs to be produced, especially fine and complex motifs. It is possible especially to obtain graphics or text having a line width of less than 200 µm, especially a line width of less than 100 µm. Accordingly, advantageously and according to the invention, said semi-transparent image is printed with a screen ruling greater than 80 lines per inch, and in particular with a screen ruling greater than 120 lines per inch.

In particular, advantageously and according to the invention, said semi-transparent image is printed by screen printing, according to the four-color technique. The inventors have in fact found, wholly surprisingly, that it is possible to print a printing composition comprising thermochromic pigments using this technique. It is thus possible to prepare a wide variety of semi-transparent images in terms of shape, size and color.

The four-color printing technique therefore allows a broad colorimetric spectrum to be produced from the following colors: cyan, magenta and yellow, and black. Accordingly, advantageously and according to the invention, said semi-transparent image is printed by printing in succession:
  a first printing composition comprising thermochromic pigments of cyan color,
  a second printing composition comprising thermochromic pigments of magenta color,
  a third printing composition comprising thermochromic pigments of yellow color, and
  a fourth printing composition comprising thermochromic pigments of black color.

The semi-transparent printed image comprises at least one transparent binder adapted so that it does not prevent the inscriptions borne by the official document to be protected from being seen. Advantageously and according to the invention, said transparent binder is chosen from the group formed of transparent polymeric binders.

Advantageously and according to the invention, the transparent binder is chosen from the group formed of transparent thermoplastic resins. In particular, advantageously and according to the invention, said transparent binder is chosen from the group formed of polymer materials such as polycarbonates, polyesters, polyacrylates, polyacrylics, especially polymethacrylates, polyurethanes, polyethers, polycaprolactones, mixtures thereof and copolymers thereof. The binder is, for example, a methyl methacrylate copolymer such as a resin marketed by DOW CHEMICAL (Midland, USA) under reference Paraloid B®.

Advantageously and according to the invention, said semi-transparent image is printed with the aid of at least one printing composition (ink) comprising thermochromic pigments and at least one transparent binder.

Advantageously and according to the invention, said semi-transparent image is printed with the aid of at least one printing composition comprising thermochromic pigments chosen from the group formed of capsules (microcapsules) comprising at least one leuco dye (also named "color developer"), at least one weak acid and at least one organic liquid (as solvent). The thermochromic pigments therefore comprise, within each microcapsule, a coloring composition comprising at least one leuco dye, at least one weak acid and at least one organic liquid. Such thermochromic pigments are known and are marketed, for example, by Polychrom CO LTD (Ansan city, Korea). They have, for example, a mean size of from 1 µm to 100 µm, especially from 2 µm to 60 µm.

The proportion of thermochromic pigments in the printing composition is chosen so as to obtain an image which is semi-transparent, and therefore allows the inscriptions printed on said official document to be seen through the semi-transparent image. Advantageously and according to the invention, said semi-transparent image is printed with the aid of at least one printing composition comprising from 9 to 22 wt. % thermochromic pigments.

The cyan color can be obtained by a mixture of a green dye and a blue dye, for example 4-[4,4'-bis(dimethylamino)benzhydrylidene]cyclohexa-2,5-dien-1-ylidene]dimethylammonium chloride (named "crystal violet lactone") for the blue color and 3-diethylamino-7-dibenzylaminofluoran for the green color.

The magenta color can be obtained by a mixture of a red dye and a blue dye.

For the red color, a number of molecules can be used, such as 3,3-bis(1-octyl-2-methyl-indol-3-yl)phthalide, 6'-ethyl(p-tolyl)amino-2'-methylspiro[isobenzofuran-1(3H), 9-[9H] xanthene-3-one, spiro[12H-benzo[a]xanthene-12 or 1'(3'H)-isobenzofuran]-3'-one, 9-[ethyl(3-methylbutyl)amino].

For the yellow color there can be used, for example, benzenamine, N,N-dimethyl-4-[2-[2-(octyloxy)phenyl]-6-phenyl-4-pyridinyl].

The weak acid is chosen, for example, from acids of the bisphenol A or bisphenol S type.

The solvent contained in the microcapsules of thermochromic pigments is generally a polar solvent such as an alcohol or an ester.

The polymeric casing of each microcapsule is formed, for example, of an encapsulating polymer such as melamine formaldehyde.

The printing composition can further comprise at least one solvent, for example an aqueous or organic solvent. Advantageously and according to the invention, the solvent is, for example, dipropylene glycol monomethyl ether and/or ethyl 3-ethoxypropanoate.

Advantageously and according to the invention, a solvent adapted to permit printing of a semi-transparent image of a device according to the invention is chosen. In particular, advantageously and according to the invention, said solvent is chosen so that it is compatible with the thermochromic pigments of the printing composition used, that is to say is not likely to damage the polymeric microcapsules of said thermochromic pigments or interfere with the coloring composition contained in the microcapsules of said thermochromic pigments (leuco dye and weak acid system).

Advantageously and according to the invention, said printing composition accordingly comprises:
  from 9 to 22 wt. % thermochromic capsules,
  from 30 to 45 wt. % transparent binder,
  from 25 to 50 wt. % solvent.

Advantageously and according to the invention, said semi-transparent image is printed onto the transparent security film and said transparent security film is applied to said surface portion so that the semi-transparent image covers the inscriptions. There are then obtained protection devices which are of large size and transparent, allowing the inscriptions printed on the official document to be seen.

Advantageously and according to the invention, said semi-transparent image extends in a format similar to that of the transparent security film. Security films of large size are in fact more difficult to forge and in particular to reproduce. Furthermore, security films of large size are also more difficult to remove and reuse on a different document. A method and a device according to the invention therefore allow protection devices of large size to be produced without preventing the inscriptions to be read that are printed on the official document from being seen.

On the other hand, it is possible to print other types of security inks on the surface of the official document and/or on and/or in the security film or to add any other security protection device in order further to reinforce its protection. It can be, for example, at least one inscription formed of a security ink composition chosen from the group consisting of photoluminescent inks—especially under ultraviolet light—, fluorescent inks, photochromic inks, thermochromic inks, iridescent inks, inks comprising interference pigments, inks comprising a soluble dye, and inks comprising a soluble binder. Advantageously and according to the invention, the official document and/or the security film can also comprise at least one security marking, especially chosen from the group of holographic markings and metallized markings (that is to say markings formed of at least one impression of an ink producing a metallic effect and/or incorporating metallic particles and/or of a metallic layer).

It is possible to apply an additional layer of protective varnish to the free surface of the last layer of thermochromic printing composition deposited on the transparent security film, so as to protect the semi-transparent image of the protection device so obtained. However, the application of such a protective varnish is not essential.

It is also possible to apply a layer of adhesive on top of the transparent security film (on the free surface of the last layer of thermochromic printing composition or on the layer of protective varnish, where present), so as to permit the transfer of the protection device and the fixing thereof to an official document to be protected.

Furthermore, although it is not essential to add anti-UV additives, additives of the HALS ("hindered amine light stabilisers") type or antioxidants to the thermochromic printing composition, it is possible to do so, such additives being chosen, however, to be compatible with use in the thermochromic printing composition.

In addition, in order to improve the compatibility between the thermochromic printing composition and the transparent film, it is possible to choose the binder and/or the transparent security film so that they are formed principally of at least one polymer material that is the same.

The invention extends to an official document obtained by a method according to the invention. It therefore relates to an official document comprising at least one transparent security layer covering at least a surface portion of a layer bearing inscriptions:
  wherein:
    the transparent security layer comprises at least one semi-transparent printed image comprising at least one transparent binder and at least one thermochromic pigment adapted to change color when there is a predetermined temperature variation,
    in a first state, named the non-activated state, at at least a first temperature, said semi-transparent printed image reveals at least one semi-transparent visible motif, so as to allow said inscriptions to be seen through the image, said motif not being visible in a second state, named the activated state, at at least a second temperature which is different from the first temperature,
    the proportion of thermochromic pigments in the binder is such that the semi-transparent image allows said inscriptions to be seen through the image when the thermochromic pigments are in the non-activated state.

More particularly, the invention relates to an official document comprising:
  at least one transparent security film covering at least a surface portion of the official document, said official document bearing inscriptions,
  the transparent security film extending in a format adapted to that of said surface portion,
  wherein:
    the transparent security film comprises at least one semi-transparent printed image comprising at least one transparent binder and at least one thermochromic pigment adapted to change color when there is a predetermined temperature variation,
    in a first state, named the non-activated state, at least a first temperature, said semi-transparent printed image reveals at least one semi-transparent visible motif so as to allow said inscriptions to be seen through the image, said motif not being visible in a second state, named the activated state, at at least a second temperature which is different from the first temperature,
    the proportion of thermochromic pigments in the binder is such that the semi-transparent image allows said inscriptions to be seen through the image when the thermochromic pigments are in the non-activated state.

The invention relates also to a method and a device for security protection and to an official document which are characterized in combination by all or some of the features mentioned hereinabove or herein below.

Figure 2:
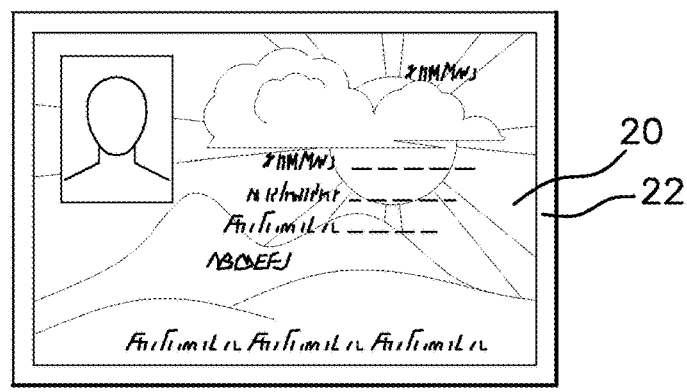
Figure 3:
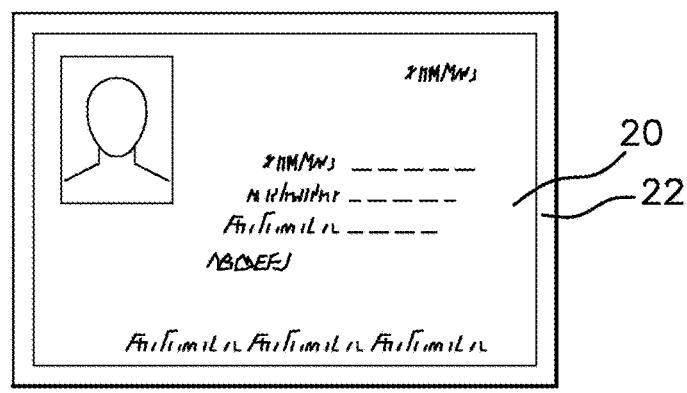

Other objects, features and advantages of the invention will become apparent upon reading the following description of a preferred embodiment thereof which is given by way of a non-limiting example and which refers to the accompanying figures, in which:

FIG. 1 is a schematic sectional view of a security protection device according to the invention, FIG. 2 is a schematic view of an official document comprising a security protection device according to the invention, the semi-transparent image being visible, FIG. 3 is a schematic view of an official document comprising a security protection device according to the invention, the semi-transparent image not being visible.

FIGS. 1 to 3 are not to scale, for the purposes of illustration. In particular, the thicknesses are exaggeratedly large in FIG. 1.

A protection device comprising a transparent security film 16 incorporating a thermochromic polychromatic semi-transparent image is produced. The security film 16 is carried by a support 18.

The protection device can constitute a hot transfer, that is to say it can be used to apply the security film 16 and to transfer it by hot lamination to a surface portion of an official document 22, as shown in FIGS. 2 and 3, especially in order to protect it from forgery and/or to authenticate the official document and/or the variable or common inscriptions previously printed on that surface portion and/or to guarantee its integrity.

At least one printing composition (or thermochromic ink) is prepared. Each printing composition comprises:
from 9 to 22 wt. % thermochromic pigments (capsules),
from 30 to 45 wt. % of at least one transparent binder, such as a thermoplastic resin, in particular an acrylic thermoplastic resin,
from 25 to 50 wt. % solvent such as dipropylene glycol monomethyl ether or ethyl 3-ethoxypropanoate.

The thermochromic microcapsules comprise at least one leuco dye (also named "color developer"), at least one weak acid and at least one organic liquid (such as a fatty acid ester).

The leuco dyes are molecules which can have two different forms: a colored form and a colorless form.

Each thermochromic ink can also comprise any type of additive (in particular less than 5 wt. %, based on the total weight of the thermochromic ink). There can be added, for example, anti-UV additives such as hydroxyphenylbenzotriazole (BTZ) or 2-hydroxyphenyl-s-triazine (HDT).

Starting from an image or photograph treated by subtractive synthesis, there are obtained four halftone films or negatives corresponding to the four primary colors (yellow, magenta, cyan, black). The image is reproduced by printing in succession the four filters of the image with the primary colors cyan, magenta, yellow and black.

The four monochromatic filtered images are printed in succession, for example by screen printing, onto a transparent support 18 formed, for example, of polystyrene and carrying a security film 16. A separating layer of varnish (not shown) can optionally be provided between each monochromatic filtered image.

The security film 16 can be transparent or semi-transparent. It comprises, for example, a continuous layer 17 formed of polyurethane. The assembly formed by the continuous layer 17 and the transparent support 18 can be, for example, a film of the type Fasprotek™ or Transfilm™ (FASVER, Baillargues, France).

Alternatively, the security film 16 can also comprise a single layer (not supported by a support), for example a film of the type Fasfilm™ (FASVER, Baillargues, France). In this case, the continuous layer 17 is, for example, formed of polyethylene terephthalate or polycarbonate. Furthermore, in the latter case, the layer 10 of adhesive is not necessary to permit the transfer by hot lamination of the security film 16 to a surface portion of an official document.

Each security film can comprise a single separable layer of varnish. Each security film can include security motifs 15b, 15c printed on and/or beneath the separable layer of varnish, for example. The security motifs 15b, 15c can be formed, for example, of motifs which are visible only under certain lighting conditions (WO 0024587, FR 2834484), motifs whose appearance varies according to the viewing angle, iridescent motifs, motifs comprising interference pigments, etc.

Four thermochromic compositions are thus prepared by the four-color technique. The first thermochromic composition 14 of cyan color is printed using and reproducing the monochromatic filtered image (obtained with the cyan filter), so as to form a first semi-transparent thermochromic monochromatic image. The second thermochromic composition 13 of magenta color is then printed on top using and reproducing the monochromatic filtered image (obtained with the magenta filter). The third thermochromic composition 12 of yellow color is then printed on top using and reproducing the monochromatic filtered image (obtained with the yellow filter). The fourth thermochromic composition 11 of black color is then printed on top using and reproducing the monochromatic filtered image (obtained with the black filter). Drying can be provided between the printing of each thermochromic composition, at ambient temperature or, for example, with the aid of a flow of hot air.

A layer 10 of adhesive is then printed on the last layer of the semi-transparent image so printed. The layer of adhesive allows the security film to be transferred and fixed to an official document.

It is also possible to add a protective film (not shown) on the layer of adhesive.

A detachment layer can optionally be provided between the transparent security film 16 and the transparent support 18, so as to facilitate the removal of the transparent support 18 once the protection device has been transferred to a substrate such as an official document.

There is thus obtained a protection device (shown in FIG. 1), the transparent security film 16 of which comprises a polychromatic semi-transparent printed image.

The protective film, if present, is then removed and the protection device is applied to the official document. The transfer can be carried out by lamination at about 100° C. to 120° C. for 5 seconds on an official document 22.

FIGS. 2 and 3 show an official document 22 (for example an identity card) to which the security protection device 20 as prepared above has been transferred.

The official document 22 bears inscriptions, especially variable items of information such as personal data. The inscriptions which are provided on the official document 22 are preferably black and in particular of a color (or shade) that is different from the colors of the motifs of the semi-transparent image covering them, so that it is readily distinguishable with the naked eye (in visible light).

In the non-activated state shown in FIG. 2, the semi-transparent polychromatic image is visible and allows the inscriptions to be seen through the image.

Gentle heating by means of contact with the fingers or the hand effects a change to the activated state shown in FIG. 3, and the semi-transparent polychromatic image is no longer visible (colorless), it still being possible to see the inscriptions through the image.

It should be noted that, in the example shown schematically in FIGS. 2 and 3, the motifs are shown with simple geometric shapes. Nevertheless, the invention allows high-definition motifs with very complex and very fine shapes to be produced.

EXAMPLE 1

Four thermochromic inks each comprising:
20 wt. % thermochromic pigments (capsules),
40 wt. % methyl methacrylate copolymer as transparent binder, and
26 wt. % dipropylene glycol monomethyl ether,
10 wt. % ethyl 3-ethoxypropanoate,
4 wt. % 2-hydroxyphenyl-s-triazine (anti-UV additive) are prepared.

Each thermochromic ink has a viscosity of approximately 7 Pa·s.

The thermochromic capsules of the first thermochromic ink, for obtaining the color cyan, are formed of a mixture of green and blue thermochromic capsules in a proportion of about 50%-50%. For the blue color, the leuco dye contained in the microcapsules is "crystal violet lactone" and for the green color, the leuco dye contained in the microcapsules is 3-diethylamino-7-dibenzylaminofluoran.

The thermochromic capsules of the second thermochromic ink, for obtaining the color magenta, are formed of a mixture of red and blue thermochromic capsules in a proportion of about 50%-50%.

The thermochromic capsules of the third thermochromic ink are thermochromic capsules of yellow color.

The thermochromic capsules of the fourth thermochromic ink are thermochromic capsules of black color.

These thermochromic capsules are marketed by Gem'innov® (Gémenos, France) and are activatable at the activation temperature of +30° C. The thermochromic capsules have a mean size of 10 μm. The organic liquid contained in the thermochromic capsules is a fatty acid ester.

Starting from an image or photograph treated by subtractive synthesis, there are obtained four halftone films or negatives corresponding to the four primary colors (yellow, magenta, cyan, black). The image is reproduced by printing in succession the four filters of the image with the primary colors cyan, magenta, yellow and black.

The four monochromatic filtered images are printed in succession by screen printing onto the free face of a transparent security film carried by a support film (film marketed under the trademark FASPROTEK® by Fasver (Baillargues, France)). Each screen-printing screen is produced from a fabric, the mesh of which comprises approximately 150 threads/cm, each thread having a diameter of 31 μm.

The first thermochromic ink of cyan color, the second thermochromic ink of magenta color, the third thermochromic ink of yellow color and the fourth thermochromic ink of black color are printed one after the other using and reproducing the monochromatic filtered image obtained with each filter. After each thermochromic ink has been printed, it is dried for 1 minute 50 seconds with the aid of a continuous flow of air at 70° C. A layer of adhesive is then printed on the fourth, black thermochromic ink.

There is thus obtained a protection device, the transparent security film of which comprises a semi-transparent printed image.

The transparent security film of the protection device is then applied to an official document (passport page) by hot lamination.

The semi-transparent image so arranged on the official document is polychromatic at ambient temperature (approximately from 18 to 25° C.), which does not prevent the inscriptions provided on the official document from being read, and becomes invisible (because it is colorless) at 30° C. and above, when the semi-transparent image is touched with the fingers or the hand, for example. The image then spontaneously becomes polychromatic again within a few seconds.

Furthermore, using the protection device of the example mentioned above applied to an official document; the following tests of light fastness are carried out:
resistance to artificial light, measured according to standards ISO 24789-1 and ISO 24789-2: the samples are subjected to the radiation of a xenon arc lamp for 24 hours in the presence of the light filter and with a black panel temperature of 50° C.;
resistance to artificial light, measured according to the method defined by the international civil aviation organization ("ICAO") concerning the durability of passports (version: 3.2 dated 30 Aug. 2006, paragraph 5.14): the samples are subjected to the radiation of a xenon arc lamp cooled in air in the presence of a filter for radiation having a wavelength below 310 nm;
resistance to ultraviolet A, measured according to standards ISO 4582 and DIN 6167: the samples are placed for 20 hours at 60° C. and at 0.72 W·m-2·nm-1.

After each test, the color difference (before and after the test) in the non-activated colored state of the protection device is determined. The color difference is measured according to standard ISO 7724-3 with the aid of a spectrocolorimeter from DR LANGE® (Düsseldorf, Germany). The color differences (delta E) so measured in each of the above tests of light fastness are all below 5, that is to say below the threshold at which the human eye perceives a difference in color.

Likewise, with regard to the fastness to weathering of the protection device of the example mentioned above applied to an official document, the following tests are carried out:
resistance to weathering measured according to standards NF T 76-109 and DIN 6167: the samples are subjected to 7 weathering cycles, each of 12 hours (that is to say 84 hours in total), under the following conditions: 70° C. for 5 hours, cooling to −40° C. in the course of 1 hour, −40° C. for 5 hours and then rise in temperature to 70° C., relative humidity 90%;
resistance to weathering measured according to the method defined by the international civil aviation organization ("ICAO") concerning the durability of passports (version: 3.2 dated 30 Aug. 2006, paragraph 5.2): the samples are subjected to 7 weathering cycles under the following conditions: 77° C. for 15 minutes, change to −32° C. in less than 60 seconds, and maintenance at −32° C. for 15 minutes;
resistance to weathering measured according to the method defined by the international civil aviation organization ("ICAO") concerning the durability of passports (version: 3.2 dated 30 Aug. 2006, paragraph 5.3): the samples are subjected to a temperature of 77° C. for 168 hours in the presence of a relative humidity of 50%;
resistance to weathering measured according to standards ISO 24789-1 and ISO 24789-2, paragraph 5.7 (50° C.; relative humidity 93%), paragraph 5.8 (−35° C. for 15 minutes, change to 50° C. in less than 15 seconds and maintenance at 50° C. for 15 minutes) and paragraph 5.9 (−35° C. for 30 minutes, +50° C. and 20% relative humidity for 6.5 hours, −35° C. for 30 minutes, then +50° C. and 85% relative humidity for 6.5 hours).

After each test of fastness to weathering, the color difference (before and after the test) in the non-activated colored state of the protection device is determined. The color difference is measured according to standard ISO 7724-3 with the aid of a spectro-colorimeter from DR LANGE® (Düsseldorf, Germany). The color differences (delta E) so measured in each of the above tests of light fastness are all below 5, that is to say below the threshold at which the human eye perceives a difference in color. The thermochromic properties of the protection device were not affected.

EXAMPLE 2

In this example, polychromatic semi-transparent images applied to an official document bearing inscriptions are produced as indicated in Example 1, but the level of pigments in the thermochromic inks is varied. It is found that, below a certain level of pigments, the thermochromic semi-transparent image is no longer visible. Above a certain level of pigments, the thermochromic semi-transparent image prevents the inscriptions provided on the official document from being seen.

The table below describes the results obtained.

| Proportion of thermochromic pigment (%) | Proportion of binder (%) | Proportion of solvent (%) | Proportion of additive (%) | Visual appearance |
|---|---|---|---|---|
| 27 | 36.5 | 33.5 | 3 | underlying inscriptions not visible |
| 20 | 40 | 36 | 4 | underlying inscriptions visible - Example 1 |
| 14.9 | 42.5 | 39.1 | 3.4 | underlying inscriptions visible |
| 9.5 | 45.2 | 41.7 | 3.6 | underlying inscriptions visible |
| 6.5 | 46.7 | 43.1 | 3.7 | thermochromic semi-transparent image not visible |

The invention can be the subject of a very large number of variant embodiments. In particular, it is possible to use thermochromic pigments which are colorless at a temperature below their activation temperature and colored at a temperature above their activation temperature. Furthermore, the thermochromic semi-transparent printed image can be formed on a face of a transparent layer that is part of the official document itself, the protection device according to the invention being formed of that transparent layer carrying the thermochromic semi-transparent printed image.

The invention claimed is:

1. A method for protecting a surface portion of a layer of an official document bearing protected inscriptions, wherein:
   a transparent security layer is applied to said surface portion so as to cover said protected inscriptions, wherein:
   the transparent security layer comprises at least one semi-transparent printed image applied as a printing composition, the printing composition comprising 9% to 22% by weight thermochromic capsules, 30% to 45% by weight transparent binder and 25% to 50% by weight solvent, the printed image comprising at least one transparent binder and at least one thermochromic pigment adapted to change color when there is a predetermined temperature variation,
   in a first, non-activated state, at a first temperature, said semi-transparent printed image reveals at least one semi-transparent visible motif allowing said protected inscriptions to be seen through the image, said motif not being visible in a second, activated state, at a second temperature, the second temperature being different from the first temperature, wherein
   a proportion of thermochromic pigments in the binder is such that the semi-transparent image allows said protected inscriptions to be seen through the image when the thermochromic pigments are in the non-activated state.

2. The method as claimed in claim 1, wherein said semi-transparent image is a colored image.

3. The method as claimed in claim 1, wherein said semi-transparent image is a polychromatic image.

4. The method as claimed in claim 1, wherein said semi-transparent image is printed by a four-color technique.

5. The method as claimed in claim 1, wherein said semi-transparent image is printed with a screen ruling greater than 80 lines per inch.

6. The method as claimed in claim 1, wherein said transparent binder is chosen from the group formed of transparent polymeric binders.

7. The method as claimed in claim 1, wherein said semi-transparent image is printed with at least one printing composition comprising at least one thermochromic pigment chosen from the group formed of capsules comprising at least one leuco dye, at least one acid and at least one solvent.

8. The method as claimed in claim 1, wherein said semi-transparent image is printed with at least one printing composition comprising from 9 to 22 wt. % thermochromic pigments.

9. The method as claimed in claim 1, wherein said semi-transparent image is printed by printing in succession:
   a first printing composition comprising at least one thermochromic pigment of cyan color,
   a second printing composition comprising at least one thermochromic pigment of magenta color,
   a third printing composition comprising at least one thermochromic pigment of yellow color, and
   a fourth printing composition comprising at least one thermochromic pigment of black color.

10. The method as claimed in claim 1, wherein:
    there is chosen a protection device comprising a transparent security film which extends in a format adapted to that of said surface portion and is carried by a support film, said transparent security layer being formed of said transparent security film,
    and said transparent security film is applied to said surface portion so that the semi-transparent image covers the protected inscriptions.

11. A device for security protection of a surface portion of a layer of an official document bearing protected inscriptions, said device comprising a transparent security layer which extends in a format adapted to that of said surface portion,
    wherein:
    the transparent security layer comprises at least one semi-transparent printed image applied as a printing composition, the printing composition comprising 9% to 22% by weight thermochromic capsules, 30% to 45% by weight transparent binder and 25% to 50% by weight solvent, the printed image comprising at least one transparent binder and at least one thermochromic pigment adapted to change color when there is a predetermined temperature variation, in a first, non-activated state, at a first temperature, said semi-transparent printed image reveals at least one semi-transparent visible motif which allows the protected inscriptions to be seen through the image, said motif not being visible in a second, activated state, at a second temperature, the second temperature being different from the first temperature, wherein a proportion of thermochromic pigments in the binder is such that the semi-transparent image allows the protected inscriptions to be seen through the image when the thermochromic pigments are in the non-activated state.

12. The device as claimed in claim 11, wherein said semi-transparent image is a polychromatic image.

13. The device as claimed in claim 11, wherein said semi-transparent image extends in a format similar to that of the transparent security layer.

14. The device as claimed in claim 11, further comprising a support film carrying a transparent security film which extends in a format adapted to that of said surface portion, said transparent security layer being formed of said transparent security film.

15. An official document comprising at least one transparent security layer covering at least a surface portion of a layer bearing inscriptions, wherein:

the transparent security layer comprises at least one semi-transparent printed image applied as a printing composition, the printing composition comprising 9% to 22% by weight thermochromic capsules, 30% to 45% by weight transparent binder and 25% to 50% by weight solvent, the printed image comprising at least one transparent binder and at least one thermochromic pigment adapted to change color when there is a predetermined temperature variation, in a first, non-activated state, at a first temperature, said semi-transparent printed image reveals at least one semi-transparent visible motif which allows said inscriptions to be seen through the image, said motif not being visible in a second, activated state, at a second temperature, the second temperature being different from the first temperature, wherein a proportion of thermochromic pigments in the binder is such that the semi-transparent image allows said inscriptions to be seen through the image when the thermochromic pigments are in the non-activated state.

16. The method as claimed in claim 2, wherein said semi-transparent image is a polychromatic image.

17. The device as claimed in claim 12, wherein said semi-transparent image extends in a format similar to that of the transparent security layer.

18. The device as claimed in claim 12, further comprising a support film carrying a transparent security film which extends in a format adapted to that of said surface portion, said transparent security layer being formed of said transparent security film.

19. The device as claimed in claim 13, further comprising a support film carrying a transparent security film which extends in a format adapted to that of said surface portion, said transparent security layer being formed of said transparent security film.

* * * * *